United States Patent [19]

Collender

[11] 4,349,252
[45] * Sep. 14, 1982

[54] STEREOSCOPIC MOTION PICTURE-CIRCULAR TO LINEAR SCAN TRANSLATOR (ALTERNATE SCREEN)-METHOD AND APPARATUS

[76] Inventor: Robert B. Collender, 709 Patterson Ave., Glendale, Calif. 91203

[ * ] Notice: The portion of the term of this patent subsequent to Nov. 4, 1997, has been disclaimed.

[21] Appl. No.: 222,375

[22] Filed: Jan. 5, 1981

[51] Int. Cl.$^3$ .............................................. G03B 35/00
[52] U.S. Cl. ......................................... 352/58; 352/43
[58] Field of Search ...................... 352/57, 58, 81, 43, 352/69, 106, 108

[56] References Cited

U.S. PATENT DOCUMENTS

| | | | |
|---|---|---|---|
| 3,815,979 | 6/1974 | Collender | 352/58 |
| 4,089,597 | 5/1978 | Collender | 352/58 |
| 4,158,487 | 6/1979 | Collender | 352/58 |
| 4,176,923 | 12/1979 | Collender | 352/58 |
| 4,231,642 | 11/1980 | Collender | 352/58 |

Primary Examiner—L. T. Hix
Assistant Examiner—Alan Mathews

[57] ABSTRACT

My invention relates to photographing scenes with a standard motion picture camera in which there is a relative motion between the scene and camera with the purpose of stereoscopic viewing of the motion picture without the need for viewing aids at the eye. The system is compatible with scenes photographed without this relative motion but the reproduction is flat. The film (or other appropriate media) is arrayed in a vertical plane and constrained to move horizontally around a segment of a circle of radius 2R. At the center of the film circle is a film motion compensator which can be a multi-faceted mirror drum of radius R. The film is rapidly scanned about the center of this circle by a scan projector. Projection optics on the projector, project the sequential film frames onto a relatively large circular cylindrical semi-specular screen. The screen is constructed of horizontal corrugated ridges to cause the incident projection rays to vertically scatter and horizontally reflect such that all rays for a given projection location on the projection circle, will converge to a vertical aerial exit slit. The exit slit locus is essentially linear while the projector moves in a circular arc about a fixed lamp. If the film and motion compensator are in locked motion, stereoscopic motion pictures can be observed by a number of people at the same time without any form of visual aid at their eyes.

2 Claims, 8 Drawing Figures

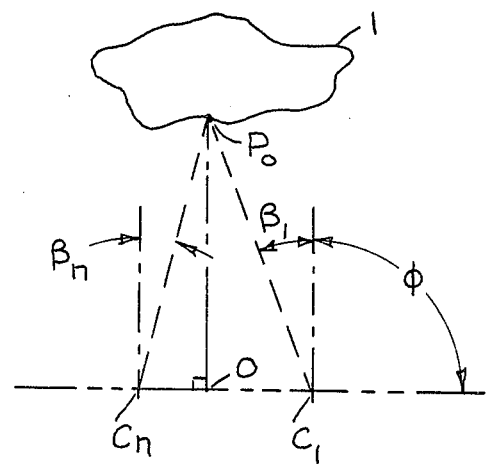
FIG. 1
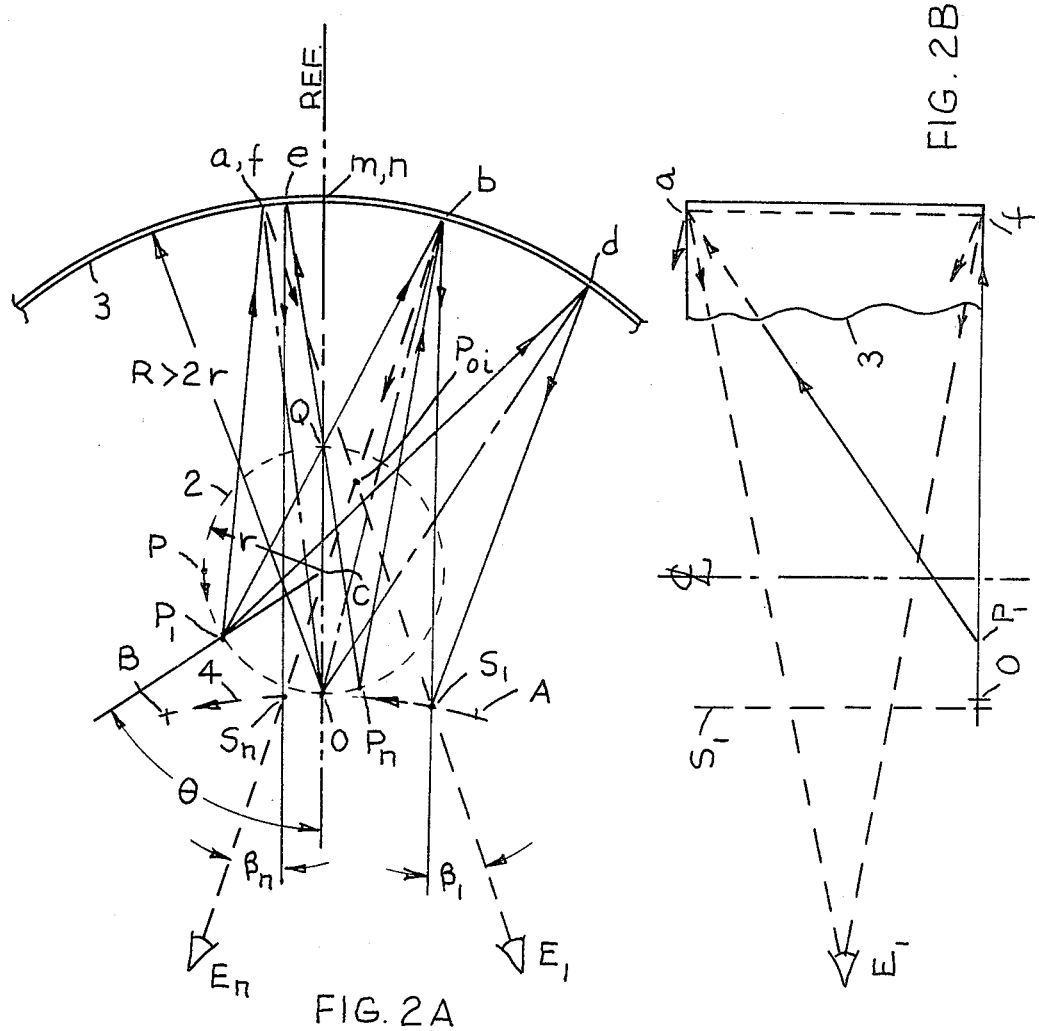
FIG. 2A
FIG. 2B

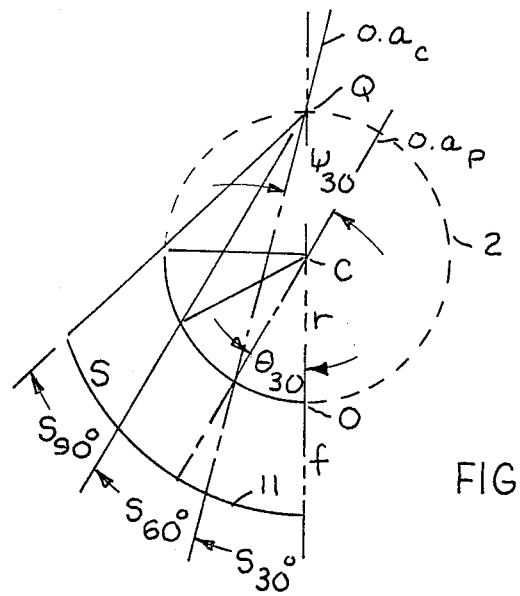
FIG. 3
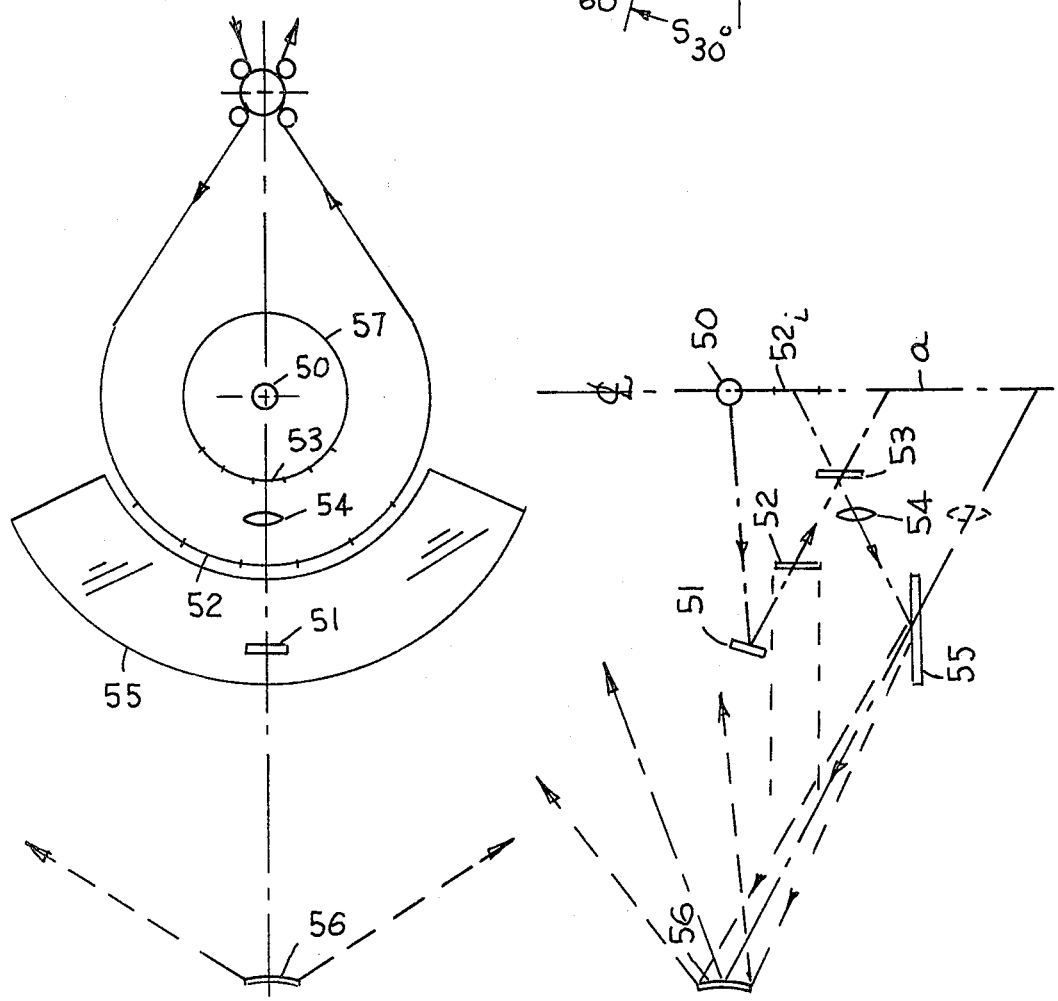
FIG. 4A
FIG. 4B

STEREOSCOPIC MOTION PICTURE-CIRCULAR TO LINEAR SCAN TRANSLATOR (ALTERNATE SCREEN)-METHOD AND APPARATUS

CROSS REFERENCES TO RELATED APPLICATIONS

This application is similar to my U.S. Pat. No. 4,231,642 dated Nov. 4, 1980 except that the concaved cylindrical and vertical segment screen which is "concentric" about the vertical scan axis in U.S. Pat. No. 4,231,642 is replaced with a concaved cylindrical nonsegmented screen which is not concentric about the scan axis. The new screen has a reflective surface as described in my U.S. Pat. No. 4,089,597 dated May 16, 1978 in FIG. 5 and supporting text. The new screen has a radius about equal to 4 times the radius of the projector scan locus described in my U.S. Pat. No. 4,231,642. However, the screen's arc has its center offset to a maximum distance measured from a point on the screen center to the projector scan locus. The center of the screen arc is located on the projector scan locus. In U.S. Pat. No. 4,231,642 the "concentric" screen has a radius of 3 times the radius of the projector scan locus.

BRIEF SUMMARY OF THE INVENTION

My invention relates to a system of recording and stereoscopic viewing of scenes and particularly to a method and means for accomplishing this purpose without viewing aids at the eyes of the observers.

Man has sought for decades to reproduce scenes in stereoscopy without the use of viewing aids at the eyes of the observers and in a manner such that a number of persons might view such scenes at one time and without restriction as to their various individual positions.

I have found that my presenting a relatively large number of related images of the scene to be viewed behind a rapidly moving vertical pseudo optically generated slit aperture the parallax thus occurring prevents one eye of each observer from seeing what the other eye sees at any and every instant of time. The aperture being in motion, each eye sees a complete image within a short interval of time. I make this interval within the persistence of vision for human observers. The brain fuses the two eye observations into a single stereoscopic view image, as my practical results predicate.

Accordingly, I am able to present a stereoscopic view of a scene to one or any reasonable number of viewers. If any or all of the viewers walk around my apparatus they will see the scene in different aspect, just as though they walked around the same scene in real life.

If the scene is reproduced from a series of stationary transparencies taken of the scene according to my method and apparatus the objects within the scene are stationary and a still stereoscopic picture is obtained. If the scene is reproduced from a series of moving transparencies photographed by a motion picture camera such that a relative motion occurs between the camera and scene and the images are reproduced according to my invention, stereoscopic motion pictures are obtained. Motion within the scene will be included and reproduced in the stereoscopic motion picture as well as the scene and camera relative motion.

Considering my system in greater detail, the perspective that one eye of any observer sees is made up of discrete vertical lines of image information taken at discrete instants of time. At these same instants of time the other eye of that observer sees a completely different perspective. The net perspective for the two eyes is different, of course, because the eyes are not coincident in space, but are spaced apart horizontally, as is well known. Considering the image as an entity, it is dissected in time and in space.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a basic stereoscopic motion picture method applicable to known and existing forms of image acquiring processes.

Another object is to provide means for reproducing stereoscopic images that are relatively rugged and are suited to retain adjustment in practice.

Other objects will become apparent upon reading the following detailed specification and upon examining the accompanying drawings, in which are set forth by way of illustration and example certain embodiments of my invention.

BRIEF DESCRIPTION OF ALL DRAWINGS

FIG. 1 shows a simplified plan view of a photographing means according to my invention.

FIG. 2A shows a simplified plan view of the projection system geometry according to my invention.

FIG. 2B shows a side elevation of FIG. 2A.

FIG. 3 shows a plan view of a portion of projection geometry with linearly precessed film frames on the film's circular arc which all have their original camera's optical axis projected through point Q.

FIG. 4A shows a plan view of a portion of a projection system embodiment according to my invention using a multi-facet mirror drum image motion stabilizer and a two facet optical scanner.

FIG. 4B shows a side elevation of FIG. 4A.

DETAILED DESCRIPTION OF DRAWINGS

Figures 5A, 5B:
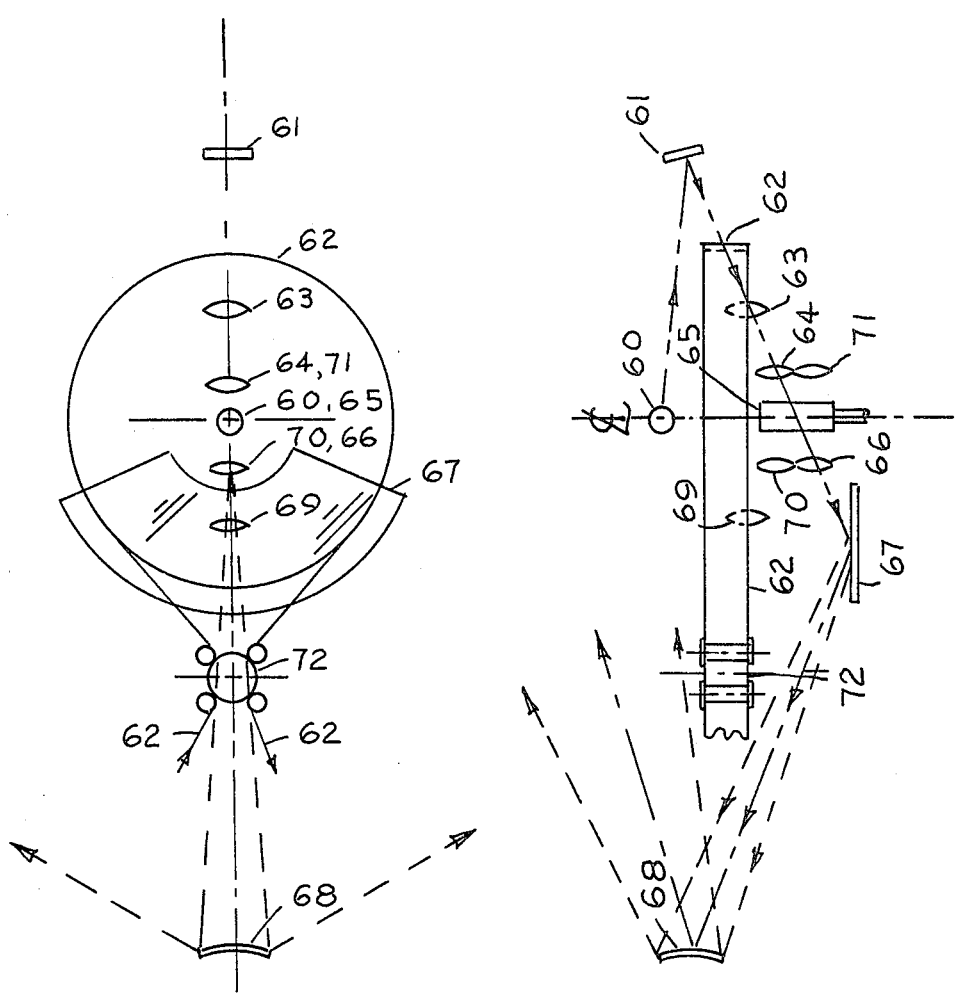
FIG. 5A shows a plan view of a portion of an alternate projection system embodiment according to my invention using a multi-facet central rotating prism image motion stabilizer and a two facet optical scanner.
FIG. 5B shows a side elevation of FIG. 5A.

FIG. 1 shows a plan view of scene photography. A moving picture camera (or equivalent) is moving from right to left and is shown at two arbitrary points $C_1$ and $C_n$. For simplicity of construction and analysis, the camera optical axis at angle $\phi$ is scan path, is shown at 90 degrees. The angle $\phi$ may assume the following angles: $0° \leq \phi \leq 180°$. An object point $P_o$ on scene 1 is arbitrarily chosen. Angles $\beta_1$ and $\beta_n$ are the relative angles that $P_o$ viewing lines make with camera optical axes for camera positions $C_1$ and $C_n$, respectively. My U.S. Pat. No. 4,089,597 of May 16, 1978 (Stereoscopic Motion Picture Scanning Reproduction Method and Apparatus) describes additional camera/scene relative motion in which the scene translates (linearly or rotationaly past a stationary motion picture camera.

FIG. 2 shows the reproduction method. FIG. 2A is a plan view and FIG. 2B is a side elevation. A projector P rotates in a scan circle 2 of radius r. The rotation direction of P is shown as counterclockwise but could go clockwise as well. The projector P is shown at positions $P_1$ and $P_n$. The projection axis is always directed toward center C. The pictures are precessed during projection so that the camera's original optical axis is always projected through point Q on scan circle 2 and on to the cylindrical screen 3. The properties of screen 3 are described in FIG. 5 and supporting text of my U.S. Pat. No. 4,089,597 data May 16, 1978. This screen has a constant vertical cross section and its front surface has a specular finish. The surface is constructed of horizontal rows of corrugated ribs such as sine waves, concaved or convexed undulations or cylindrical lenslet shapes. The screen can be horizontally brushed stainless steel which can be overcoated with an aluminized finish or used directly. The screen can also be plated or aluminized ribbed plastic. The pitch of the corrugations should be fine enough to prevent detection at the nearest view distance. The purpose of the screen is to vertically scatter and horizontally reflect incident light from projector P while P rotates about projection scan locus 2. Screen 3 has a radius in excess of the diameter of the projection scan locus 2. A convenient value for the screen radius R is 4 times the projection scan locus radius r. The center of the screen arc is located at point O in FIG. 2A.

The ray trace geometry of FIG. 2A for an arbitrary scan projector $P_1$ is such that all projection rays emanating from $P_1$ reflect from screen 3 to intersect on aerial exit slit scan locus 4. A vertical aerial exit slit for $P_1$ is formed at point $S_1$ on locus 4. Points a, b and d on screen 3 represent arbitrary screen intercepts for three rays from $P_1$ which reflect to $S_1$. A ray $P_1b$ passing through Q carries the optical axis of the original picture frames and the reflected ray $bS_1$ is nearly parallel to reference line Om. As shown in FIG. 2B, projected rays $P_1a$ and $P_1f$ (each in a vertical plane), will scatter vertically at screen 3 to enter eye $E_1$ while viewing in the direction of aerial exit slit $S_1$. FIG. 2A shows a plan view of the formation of arbitrary image point $P_{oi}$ which is in relatively the same position as $P_o$ of FIG. 1 when the camera positions $C_1$ and $C_n$ of FIG. 1 are compared with projector $P_1$ and $P_n$ of FIG. 2A. Angles $\beta_1$ and $\beta_n$ are measured between camera optical axes and photographed rays $C_1P_o$ and $C_nP_o$ respectively, in FIG. 1 and between reconstructed camera optical axes and view lines $E_1S_1P_{oi}$ and $E_nS_nP_{oi}$, respectively, in FIG. 2A.

In FIG. 2A, aerial exit slit locus 4 is slightly concaved to the viewing audience for a screen 3 radius R=4r. The reflected optical axes rays that were incident on screen 3 through point Q are nearly parallel for the R=4r case. If R=3r, the aerial exit slit locus 4 is approximately linear passing through point O but the reflected optical axes rays are not parallel. Although R=3r should perform satisfactorily, the R=4r case appears better suited to the geometry of 3-D projection because of the nearly parallel reflected original camera's optical axes rays. The system should perform satisfactorily for scan projector positions subtending up to 90 degrees from reference line OCQ measured at C in FIG. 2A.

Scan projector P angular scan rate about scan axis C in FIG. 2A is such that any given projector facet (all of which are identical and positioned about the scan circle 2 at regular intervals) is replaced by an adjacent projector facet within the period of the persistence of vision. A two facet system has two projector facets 180 degrees apart and the scanner rotation rate may be 1500 to 1800 rpm. This will give refresh rates of 50 to 60 Hz, respectively. The standard refresh rate for theatre motion pictures is 48 Hz and for U.S. television it is 60 Hz. These rates assure that no flicker is perceptible in viewing the 3-D pictures. As projector P scans in a counterclockwise direction in FIG. 2A, the aerial exit slit moves over locus 4 from A to B. A two facet scan system would start the scan again at A by the second facet when the first facet leaves B (assuming a 180 degree scan angle for each facet). If three facets were used on the scanner; when scan facet 1 is at B, facet 2 is at O and facet 3 is at A. Scan rates are correspondingly reduced for higher facet numbers to maintain the same picture interrupt rate.

FIG. 3 shows the geometric test for precession of the camera's optical axis (o.$a_c$) with respect to the projector's optical axis (o.$a_p$). o.$a_p$ is always through scan center C, but o.$a_c$ must pass through Q for any scan angle $\theta$. The arc of film 11 is arbitrarily shown concentric with C. Since film 11 has picture frames at regular intervals, it must be shown that for any of the scan angles $\theta$, that precession of o.$a_c$ will allow projection toward point Q. S is the arbitrary arc length measured along film 11. It can be shown that:

$$S = (r+f)\left\{ \theta/2 + \sin^{-1}\left[\frac{r}{(r+f)}\sin\theta/2\right]\right\}$$

or for $S(\text{normalized}) = S' = s/r =$ $$(1 + f/r)\left\{ \theta/2 + \sin^{-1}\left[\frac{1}{(1+f/r)}\sin\theta/2\right]\right\}$$

The worst error will occur at the maximum desired scan angle. In this example, a scan angle of $\theta = 60°$ is used. It can be shown that the following errors occur for various values of f/r at $\theta = 60°$:

TABLE 1

| | | o.$a_c$ Precession Errors | | |
|---|---|---|---|---|
| f/r | error % | S | $S_{ideal}$ | remarks |
| 0.1 | 0.41 | | | |
| 0.5 | 1.06 | 1.2952 | 1.309 | |
| 0.93 | 1.162 | | | |
| 0.94 | 1.1622 | | | max error |
| 1.0 | 1.16 | 1.5525 | 1.5707 | |
| 1.5 | 1.1 | | | |
| 2.0 | 1.01 | | | |
| 20.0 | 0.2 | | | |

Note:
for actual values of S, multiply by r.

It can be concluded from table 1 that linearity is well within accepted tolerance so that the film frame centerlines representing the camera's optical axes (being equally separated) and the equally separated adjacent projection locations can be properly precessed to result in a value of $\Psi$ equal to $\theta/2$ (all passing through point Q in FIG. 3).

FIG. 4A and FIG. 4B show plan and side elevation views respectively of one method of projection using a mirror drum image motion compensator that allows the film to move continuously. Only one scan facet is shown in the drawings. For a two facet system, the other facet is 180 degrees away from the one shown. A facet of projection is defined as all of the optics from the projection lamp to the last element of projection optics. The principle of mirror drum image motion compensation for continuously moving film is covered in my U.S. Pat. No. 4,089,597 of May 16, 1978. Projection lamp 50 light is diverted by scanning mirror 51 through circular film 52 which is imaged on rotation axis-a by mirror drum 57 mirror facet 53 as 52; and projected by scanning projection lens 54 onto horizontal fixed mirror 55 which reflects the projected images in sequence to aspheric wide angle projection mirror 56 which in turn reflects the picture to cylindrical screen 3 of FIG. 2A. The optical axis of projection lens 54 is maintained normal to projection screen 3 of FIG. 2A to eliminate vertical keystone distortion. Film 52 picture frames are precessed to mirror drum 57 in accord with method described in FIG. 3.

FIG. 5A and FIG. 5B are plan and elevation views respectively of an alternate projection system method using a prism compensator, two facets of which are shown in the figures. The principle of image motion compensation using a prism and continuously moving film is covered in my U.S. Pat. No. 4,089,597 of May 16, 1978. In FIG. 5A and FIG. 5B, light from projection lamp 60 reflects from scanning mirror 61 through film 62 and is relayed to scanning field lens 64 by scanning relay lens 63. Scanning projection lens 66 views the film image in field lens 64 through multi-facet prism 65 rotating at high speed on axis-a. The projected picture reflects from stationary horizontal plane mirror 67 to the aspheric reflecting mirror 68 which directs the picture to screen 3 described in FIG. 2A. The other projection facet picks up the same light from lamp 60-180 degrees later in the cycling of the projector scanner and scanning relay lens 69 images film 62 onto scanning field lens 70. In this case, projection lens 71 is used. All of the lenses have their optical axes normal to screen 3 of FIG. 2A to eliminate vertical keystone distortion.

Alternate projection methods utilize fixed optics at each projection point with a central wide horizontal angle strobe projection lamp and continuous film or the film can be intermittently advanced when a constant intensity wide horizontal angle projection lamp is used. The film or projection frame media (reflective or transmissive) may remain stationary in the alternate projection methods.

Having thus fully described my invention and the manner in which it is to be practiced, I claim:

1. A method of recording and reproducing stereoscopic views for observation by plural observers without visual aids at the eyes of said observers, comprising:
photographing multiple sequential views of a scene from a motion picture camera in a manner such that between each sequential view relative motion takes place between the camera and scene and the optical axis of the camera for the various views is essentially coincident or parallel with each other; reproducing said views sequentially by projecting the views from a scanning projector onto a screen; said scanning projector being positioned, during the projection of successive views, at successive positions about the arc of a projection circle so as to project the images to said screen on the opposite side of said projection circle; said screen being stationary and of larger radius compared with said projection circle and comprised of elementary horizontal corrugated ridges to vertically scatter and horizontally reflect incident light from said projector, said screen having its arc center at a single reference point, said reference point being located on the opposite side of said projection circle center from said screen and on a line bisecting said screen, said line passing through said projection circle center; said scanning projector constrained to project said sequential views toward a common point located on said bisecting line between said projection circle center and said screen; and the scanning of said projector being at a rate sufficient to be within the period of persistence of vision of an observer.

2. A construction for displaying motion pictures stereoptically to observers situated in front of the viewing screen of said construction, said construction including:
a stationary concaved horizontally reflective and vertically scattering viewing screen having a radius comprised of horizontal corrugated ridges, one or more projectors rotating about a vertical axis on a smaller radius than said screen while projecting a sequence of pictures onto said screen, a multi-facet mirror drum with rotating axis coincident with said vertical axis, a motion picture film constrained to a circular film guide having axis coincident with said vertical axis, each sequential picture frame of said film slightly shifted laterally with respect to a given mirror facet of said mirror drum so that the direction of projection of the optical axis for all views photographed, is toward a common point located between said vertical axis and said screen, said screen directing said sequential views projected by said projector to a horizontally moving vertical aerial exit slit.

* * * * *